(12) United States Patent
Tressler et al.

(10) Patent No.: US 9,400,603 B2
(45) Date of Patent: Jul. 26, 2016

(54) IMPLEMENTING ENHANCED PERFORMANCE FLASH MEMORY DEVICES

(71) Applicant: International Business Machines Corporation, Armonk, NY (US)

(72) Inventors: Gary A. Tressler, Sandy Hook, CT (US); Diyanesh Babu C. Vidyapoornachary, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 14/571,861

(22) Filed: Dec. 16, 2014

(65) Prior Publication Data

US 2016/0170646 A1    Jun. 16, 2016

(51) Int. Cl.
| | | |
|---|---|---|
| G06F 12/00 | (2006.01) | |
| G06F 3/06 | (2006.01) | |
| G06F 12/06 | (2006.01) | |
| G06F 12/02 | (2006.01) | |
| G06F 11/10 | (2006.01) | |

(52) U.S. Cl.
CPC ............ *G06F 3/0604* (2013.01); *G06F 3/0652* (2013.01); *G06F 3/0679* (2013.01); *G06F 11/106* (2013.01); *G06F 11/1008* (2013.01); *G06F 12/0246* (2013.01); *G06F 12/0253* (2013.01); *G06F 12/0261* (2013.01); *G06F 12/0269* (2013.01); *G06F 12/0276* (2013.01); *G06F 12/0607* (2013.01)

(58) Field of Classification Search
CPC ... G06F 3/0604; G06F 3/0652; G06F 3/0679; G06F 12/0238; G06F 12/0246; G06F 12/0253; G06F 12/0261; G06F 12/0269; G06F 12/0276; G06F 12/0607; G06F 11/1008; G06F 11/106
See application file for complete search history.

(56) References Cited

U.S. PATENT DOCUMENTS

| | | | |
|---|---|---|---|
| 8,176,237 B2 | 5/2012 | Yano et al. | |
| 2004/0205289 A1* | 10/2004 | Srinivasan | G06F 12/0246 711/103 |
| 2010/0325351 A1 | 12/2010 | Bennett | |
| 2012/0036309 A1 | 2/2012 | Dillow et al. | |
| 2012/0059978 A1 | 3/2012 | Rosenband et al. | |
| 2012/0198128 A1 | 8/2012 | Van Aken | |
| 2012/0317377 A1 | 12/2012 | Palay et al. | |
| 2013/0246690 A1 | 9/2013 | Haneda | |

FOREIGN PATENT DOCUMENTS

WO    WO2010118230 A1    10/2010

OTHER PUBLICATIONS

Appendix P—List of IBM Patents or Patent Applications Treated as Related—Apr. 30, 2015.

* cited by examiner

*Primary Examiner* — Shawn X Gu
(74) *Attorney, Agent, or Firm* — Joan Pennington

(57) ABSTRACT

A method and apparatus for implementing enhanced performance in a flash memory system in a computer system. A flash memory chip includes a function engine performing garbage collection and scrub operations using an internal bus for data movement. The system includes an on-flash chip memory buffer buffering garbage collection and scrub requests. Garbage collection and scrub operations are interleaved with mainline reads and writes.

12 Claims, 10 Drawing Sheets

300
| READ | ~ 50μs, 16 KB page | |
|---|---|---|
| WRITE | ≈ 1.6 ms, 16 KB page | |
| ERASE | ~ 5 ms (per block) | |
FIG. 3A
310
FIG. 3B
320
FIG. 3C

400

| READ | ~ 50µs, 16 KB page |  |
| --- | --- | --- |
| WRITE | ≈ 1.6 ms, 16 KB page |  |
| ERASE | ~ 5 ms (per block) |  |
| GC COMMAND | 10µs (Time to communicate to Flash device for list of blocks to be GCed) |  "Background operation" |

[ ] BACKGROUND ERASE OPERATIONS IN PARALLEL TO WRITE
    OPERATIONS WITHIN FLASH DEVICE

410

420

| 500 | | |
|---|---|---|
| READ | ~ 50μs, 16 KB page | R |
| WRITE | ≈ 1.6 ms, 16 KB page | W |
| ERASE | ~ 5 ms (per block) | E |
| GC COMMAND | 10μs (Time to communicate to Flash device for list of blocks to be GCed) | Background operation |
[ ] BACKGROUND ERASE OPERATIONS IN PARALLEL TO WRITE OPERATIONS WITHIN FLASH DEVICE
FIG. 5A
FIG. 5B
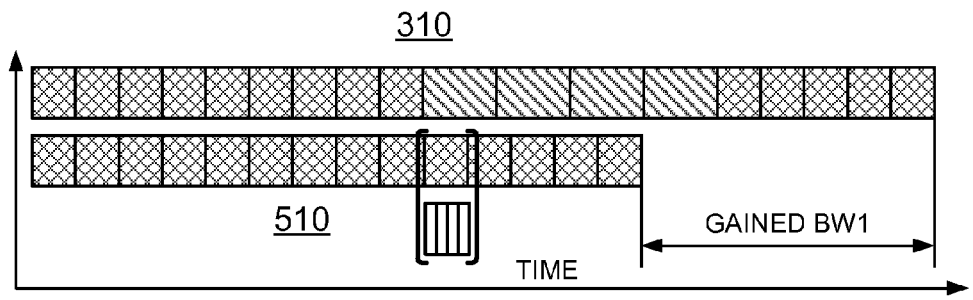
FIG. 5C
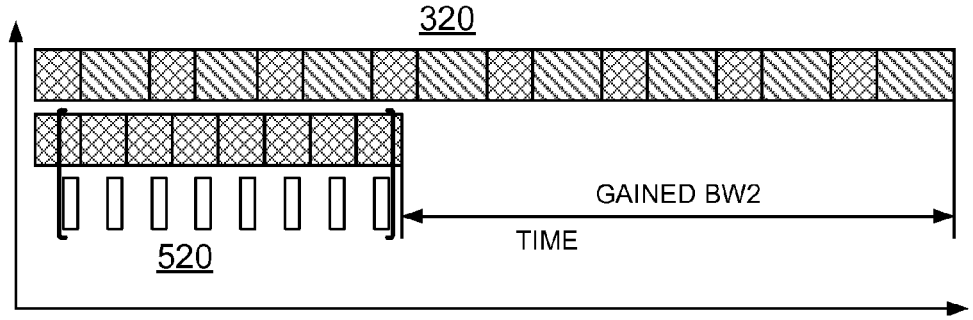

600

| READ | ~ 50μs, 16 KB page |  |
|---|---|---|
| WRITE | ≈ 1.6 ms, 16 KB page |  |
| ERASE | ~ 5 ms (per block) |  |
| GC COMMAND | 10μs  (Time to communicate to Flash device for list of blocks to be GCed ) |  *Background operation* |

610

620

IMPLEMENTING ENHANCED PERFORMANCE FLASH MEMORY DEVICES

FIELD OF THE INVENTION

The present invention relates generally to the data processing field, and more particularly, relates to a method and apparatus for implementing enhanced performance in a flash memory system.

DESCRIPTION OF THE RELATED ART

In flash memory devices, data are written in pages. Memory can only be erased in larger units called blocks typically made up of multiple pages. If the data in some of the pages of the block are no longer needed, such as stale pages, only the pages with good data in that block are read and re-written into another empty block, such as a previously erased empty block. Then the free pages left by not moving the stale data are available for new data. This process is called garbage collection (GC).

All solid state drives (SSDs) include some level of garbage collection, while the SSDs typically differ in when and how fast the garbage collection (GC) process is performed. Current methods for GC use the mainline bus to perform erase operations that are essential to free up blocks to accommodate subsequent writes from host. This GC process however locks up the mainline bus bandwidth for erase operations and therefore overall performance reduces significantly.

There are numerous arrangements and industry practices to balance between erase and write operations to optimize the performance; however, in such known methods, erase operations are still essential operations of the GC process that requires I/O bus bandwidth.

Scrub operations are vital to ensure data integrity, to catch and correct errors preemptively, before mainline reads hit the errors. However, the scrub operation also locks up the read bandwidth by the flash controller.

A need exists for an effective method and a flash memory system having the ability for implementing enhanced performance including garbage collection (GC) and scrub on flash memory chips in the flash memory system.

SUMMARY OF THE INVENTION

Principal aspects of the present invention are to provide a method and apparatus for implementing enhanced performance in a flash memory system in a computer system. Other important aspects of the present invention are to provide such method, and apparatus substantially without negative effects and that overcome many of the disadvantages of prior art arrangements.

In brief, a method, and apparatus for implementing enhanced performance in a flash memory system in a computer system. A flash memory chip includes a function engine performing garbage collection and scrub operations using an internal bus for data movement, preserving I/O bandwidth. The system includes an on-flash chip memory buffer buffering garbage collection and scrub requests. Garbage collection and scrub operations are interleaved with mainline reads and writes.

In accordance with features of the invention, a switching infrastructure multiplexer in the flash memory chip selects between the internal bus and the mainline bus.

In accordance with features of the invention, the flash controller communicates a list of blocks to be scrubbed and the function engine performs the scrub taking control of the internal bus, resulting in a significant decrease in I/O bandwidth consumption.

In accordance with features of the invention, mainline write operations from controller are performed normally when subsequent write operation have enough free blocks to accommodate those write operations. All blocks are connected to the mainline bus by default.

In accordance with features of the invention, host writes having dependency on the creation of free blocks before the write operations can happen require a garbage collection process. Controller firmware can exploit a queue portion or a full write queue to identify a set of blocks to be garbage collected. Controller firmware can communicate the list of such blocks to the flash memory device and initiate a background GC process at the flash memory device level. Controller can drive mainline writes with an order of write operations and erase operations for garbage collection in the queue being rearranged or reordered to ensure enough blocks are freed up in the flash memory device, as a background process in parallel to current writes, to accommodate upcoming writes to ensure maximum performance.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3A, 3B, and 3C illustrate example erase operations and write operations for garbage collection within a flash memory system of FIG. 2 for implementing enhanced performance in accordance with the preferred embodiments;

FIGS. 5A, 5B, and 5C illustrate example operations of background erase operations in parallel to write operations within the flash memory system of FIG. 2 for implementing enhanced performance in accordance with the preferred embodiments;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and apparatus are provided for implementing enhanced performance in a flash memory system. Managing garbage collection and scrub operations are provided at flash memory device level. A controller communicates blocks for garbage collection and pages for scrub to a function engine within the flash device.

Figure 1:
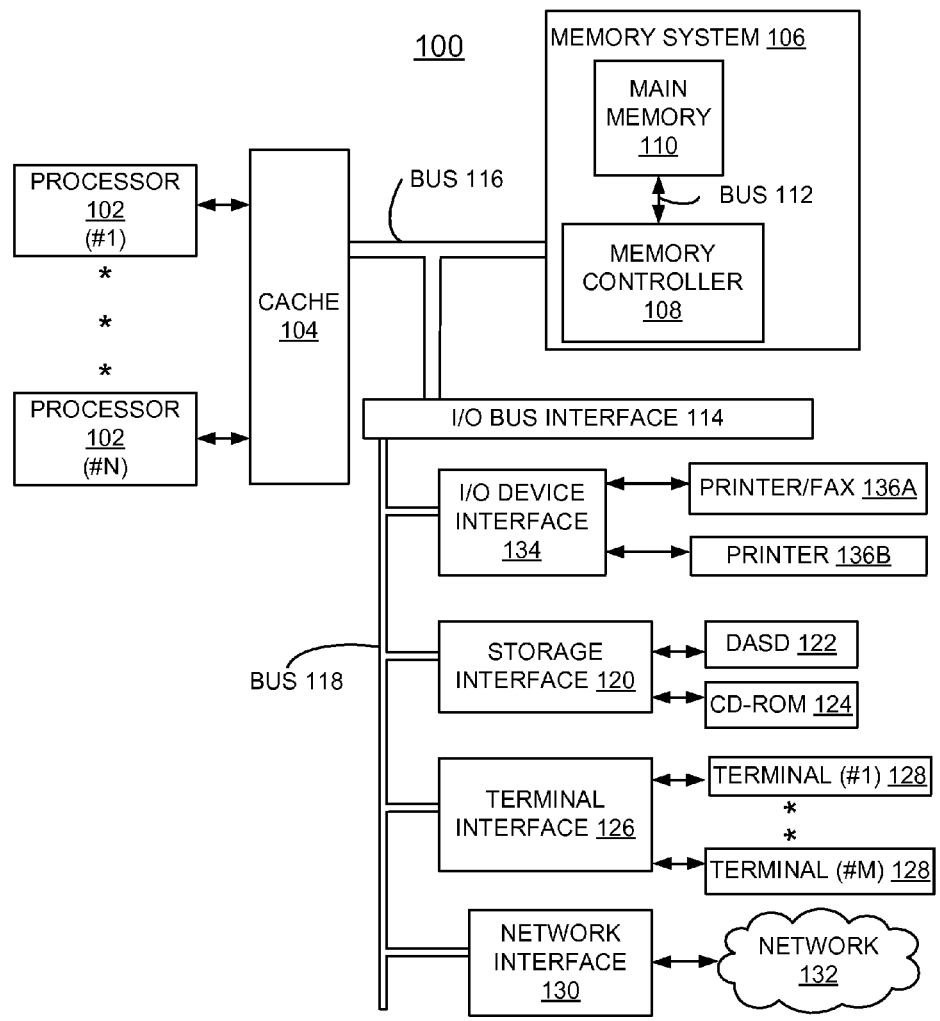
FIG. 1 is a block diagram of an example computer system embodying the present invention.

Having reference now to the drawings, in FIG. 1, there is shown a computer system embodying the present invention generally designated by the reference character 100 for implementing enhanced performance in a flash memory system in accordance with the preferred embodiment. Computer system 100 includes one or more processors 102 or general-purpose programmable central processing units (CPUs) 102, #1–N. As shown, computer system 100 includes multiple processors 102 typical of a relatively large system; however, system 100 can include a single CPU 102. Computer system 100 includes a cache memory 104 connected to each processor 102.

Computer system 100 includes a memory system 106 including a memory controller 108 and a main memory 110 connected by a bus 112. Bus 112 is one or more busses that send address/command information to main memory 110 and send and receive data from the memory 110. Main memory 110 is a random-access semiconductor memory for storing data, including programs. Main memory 110 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, memory controller 108 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1–M, a network interface 130 coupled to a network 132, such as the Internet, local area or other networks, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

Computer system 100 is shown in simplified form sufficient for understanding the present invention. The illustrated computer system 100 is not intended to imply architectural or functional limitations. Although main memory 110 of main memory system 106 is represented conceptually in FIG. 1 as a single entity, it will be understood that in fact the main memory is more complex. In particular, main memory system 106 comprises multiple modules and components. The present invention can be used with various hardware implementations and systems and various other internal hardware devices.

Figure 2:
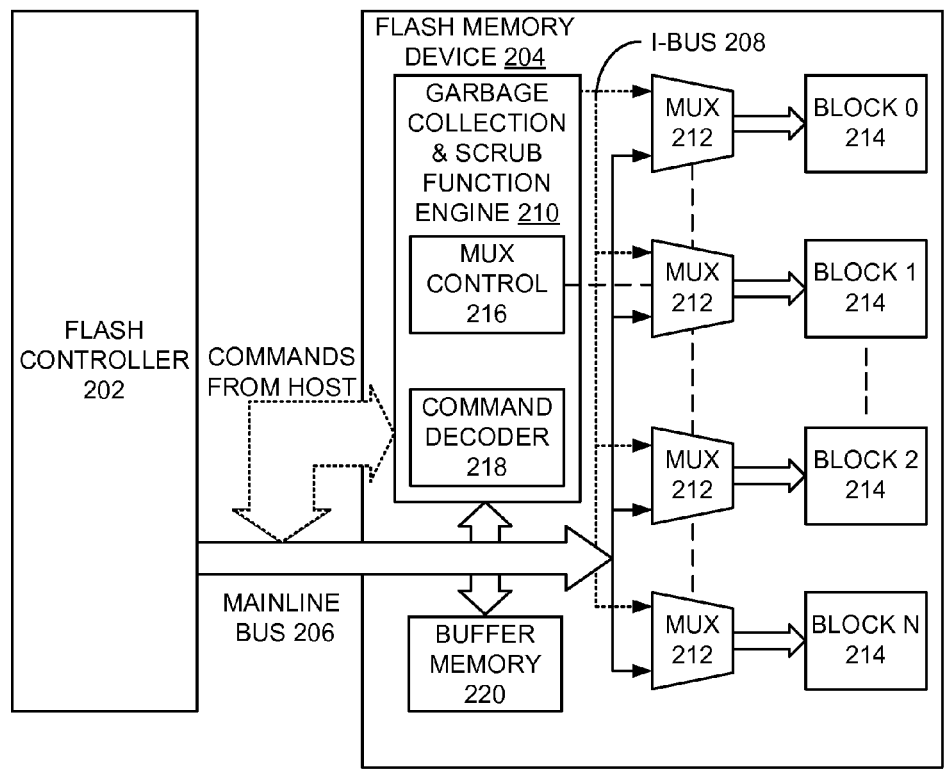
FIG. 2 is a block diagram illustrating an example flash memory system for implementing enhanced performance in the flash memory system in the computer system of FIG. 1 in accordance with preferred embodiments.

An example flash memory system is illustrated and described with respect to FIG. 2 for implementing enhanced performance in accordance with embodiments of the invention.

Referring now to FIG. 2 there is shown an example flash memory system generally designated by the reference character 200 for implementing enhanced performance in the computer system 100 in accordance with the preferred embodiment. Flash memory system 200 includes a flash controller 202 and a flash memory device 204 connected by a mainline bus 206. Flash memory device 204 includes an internal bus (I-bus) 208 for implementing enhanced performance in accordance with embodiments of the invention.

In accordance with features of the invention, a host controller or the flash controller 202 tracks blocks for garbage collection and communicates the list of blocks to be garbage collected to the flash memory device 204. The flash controller 202 communicates a list of pages/blocks to be scrubbed the flash memory device 204.

In accordance with features of the invention, flash memory device 204 includes a function engine 210 for performing device level garbage collection and scrub processes. The garbage collection and scrub function engine 210 is connected by the internal bus (I-bus) 208 to a switching infrastructure multiplexer 212 within the flash memory chip 204. The switching infrastructure multiplexer 212 is coupled to a plurality of memory blocks #1–N, 214 selecting between the internal bus 208 and the mainline bus 206. The garbage collection and scrub function engine 210 includes a multiplexer control 216 and a command decoder 218 that control the switching infrastructure multiplexer 212 to select between the internal bus 200 and the mainline bus 206. The flash memory device 204 includes a buffer memory 220 to buffer all garbage collection erase and scrub requests. The flash memory device 204 performs these garbage collection erase and scrub operations internally, with interleaved mainline traffic in accordance with embodiments of the invention.

In accordance with features of the invention, the function engine performs garbage collection and scrub operations internally by taking control of internal bus (I-bus) 208. Mainline writes are performed as usual; for example, all blocks are connected to mainline bus 206 by default.

Referring to FIGS. 3A, 3B, and 3C, there are shown example erase operations and write operations for garbage collection within a flash memory system 200 of FIG. 2. In FIG. 3A, there are shown read, write and erase garbage collection operations generally designated by the reference character 300. As shown, a read operation is approximately 50 microseconds for a 16 KB page, a write operation is approximately 1.6 milliseconds for a 16 KB page, and an erase operation is about 5 milliseconds per block.

In FIG. 3B, there are shown write and erase garbage collection operations generally designated by the reference character 310 with 9 writes, followed by 4 erase, and 5 writes.

In FIG. 3C, there are shown write and erase garbage collection operations generally designated by the reference character 320 with each write followed by an erase.

Figure 4A:
FIGS. 4A, 4B, and 4C illustrate example operations of background erase operations in parallel to write operations within the flash memory system of FIG. 2 for implementing enhanced performance in accordance with the preferred embodiments.
Figure 4A:
Figure 4A:
Figure 4A:
Figure 4B:
Figure 4C:
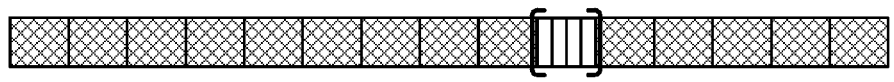

Referring to FIGS. 4A, 4B, and 4C there are shown example operations of background erase operations in parallel to write operations within the flash memory system 200 for implementing enhanced performance in accordance with the preferred embodiments.

In FIG. 4A, there are shown read, write, erase garbage collection operations and garbage collection commands generally designated by the reference character 400. As shown, a read operation is approximately 50 microseconds for a 16 KB page, a write operation is approximately 1.6 milliseconds for a 16 KB page, an erase operation is about 5 milliseconds per block, and the garbage collection command of approximately 10 microseconds for providing a background erase operation. The background erase operations shown in brackets are performed in parallel to write operations within the flash memory device 204.

In FIG. 4B, there are shown write and erase garbage collection operations generally designated by the reference character 410 with 9 writes, followed by 4 background erase operations in parallel to write operations shown in brackets and 5 writes.

In FIG. 4C, there are shown write and erase garbage collection operations generally designated by the reference character 420 with each write followed by a background erase operation shown in brackets.

Referring to FIGS. 5A, 5B, and 5C, there are shown example operations of background erase operations in parallel to write operations within the flash memory system 200 for implementing enhanced performance with bandwidth preservation in accordance with the preferred embodiments.

In FIG. 5A, there are shown read, write, erase garbage collection operations and garbage collection commands generally designated by the reference character 500. As shown, a read operation is approximately 50 microseconds for a 16 KB page, a write operation is approximately 1.6 milliseconds for a 16 KB page, an erase operation is about 5 milliseconds per block, and the garbage collection command of approximately 10 microseconds providing a background erase operation. Also the background erase operations shown in brackets are performed in parallel to write operations within the flash memory device 204.

In FIG. 5B, there are shown the write and erase garbage collection operations 310 with 9 writes, followed by 4 erase, and 5 writes of FIG. 3B, together with write and erase garbage collection operations generally designated by the reference character 510 with 9 writes, followed by 4 background erase operations shown in brackets and 5 writes illustrating gained bandwidth indicated by an arrow labeled GAINED BW1

In FIG. 5C, there are shown write and erase garbage collection operations 320 with a write followed by an erase of FIG. 3C, together with write and erase garbage collection operations generally designated by the reference character 420 with a write followed by background erase operation shown in brackets illustrating gained bandwidth indicated by an arrow labeled GAINED BW2.

Figure 6A:
FIGS. 6A, 6B, and 6C illustrate example operations of background erase operations in parallel to write operations within the flash memory system of FIG. 2 for implementing enhanced performance in accordance with the preferred embodiments.
Figure 6A:
Figure 6A:
Figure 6A:
Figure 6B:
Figure 6C:

Referring to FIGS. 6A, 6B, and 6C, there are shown example operations of background erase operations in parallel to write operations within the flash memory system 200 for implementing enhanced performance with bandwidth preservation in accordance with the preferred embodiments.

In FIG. 6A, there are shown read, write, erase garbage collection operations and garbage collection commands generally designated by the reference character 600. Also as shown, a read operation is approximately 50 microseconds for a 16 KB page, a write operation is approximately 1.6 milliseconds for a 16 KB page, an erase operation is about 5 milliseconds per block, and the garbage collection command of approximately 10 microseconds to communicate a list of blocks to be garbage collected providing a background erase operation.

In FIG. 6B, there are shown write and erase garbage collection operations generally designated by the reference character 610 with 9 writes (9×1.6 ms or 14.4 ms), followed by 4 background garbage collection (GC) commands (4×5 ms or 20 ms with garbage collection in device 204 performed in background) and 5 writes (5×1.6 ms or 8 ms).

In FIG. 6C, there are shown write and erase garbage collection operations generally designated by the reference character 620 for eight continuous cycles with a write (1×1.6 ms)×8 cycles or 12.8 ms), followed by background erase operation (1×5 ms)×8 cycles or 40 ms with garbage collection in device 204 performed in background).

Figure 7A:
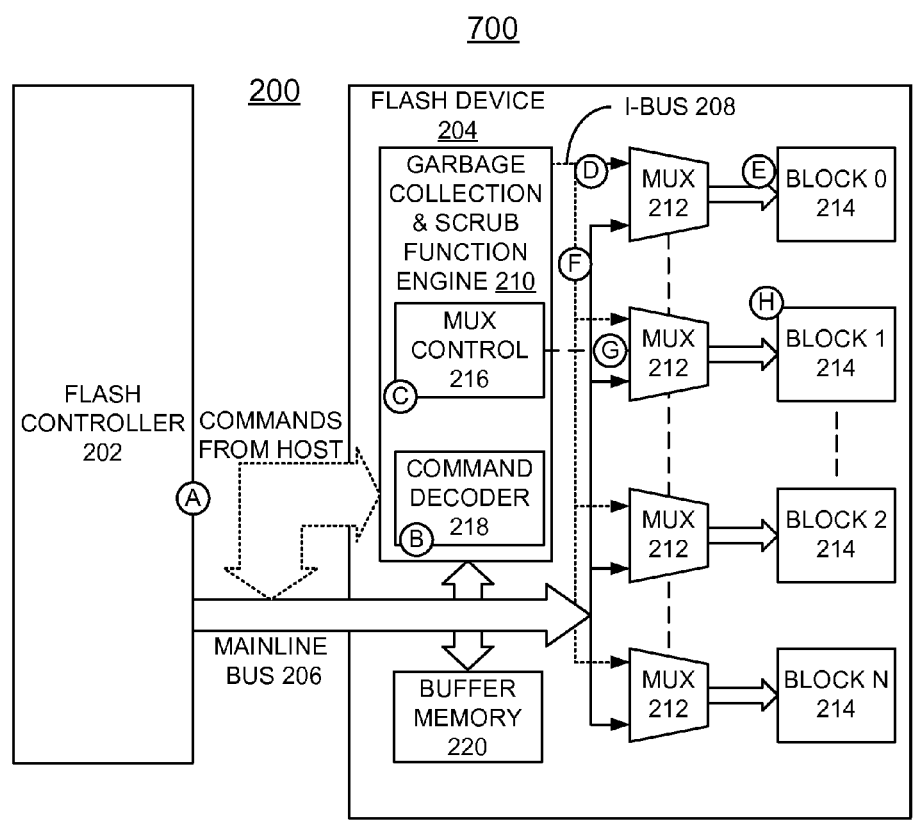
FIG. 7A is a block diagram illustrating example erase operation process and write operation process in the example flash memory system of FIG. 2 in accordance with preferred embodiments.
Figure 7B:
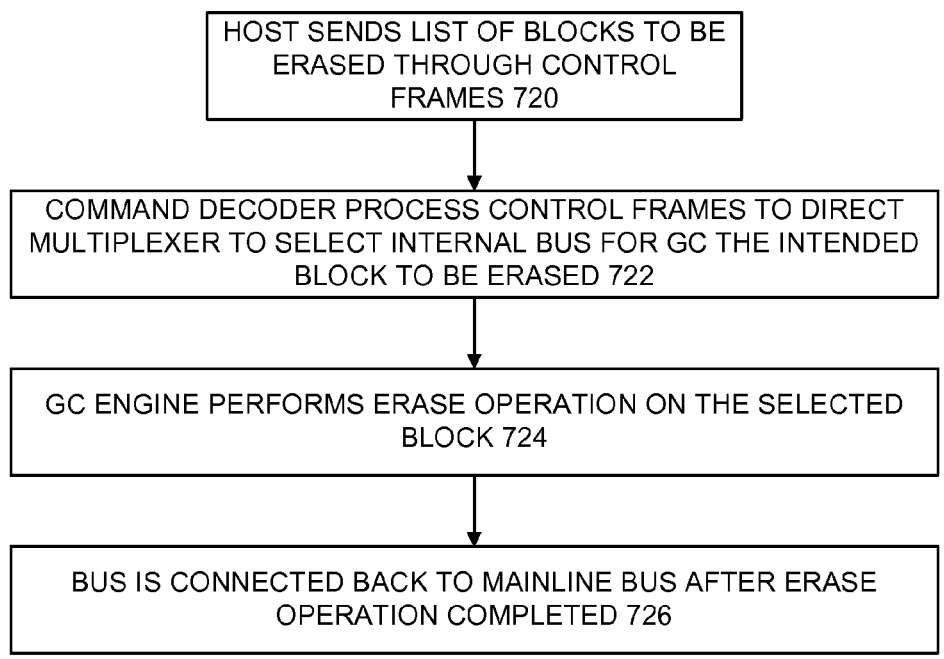
FIGS. 7B and 7C are flow charts respectively illustrating example steps of the erase operation process and write operation process of FIG. 7A in the example flash memory system of FIG. 2 in accordance with preferred embodiments.
Figure 7C:
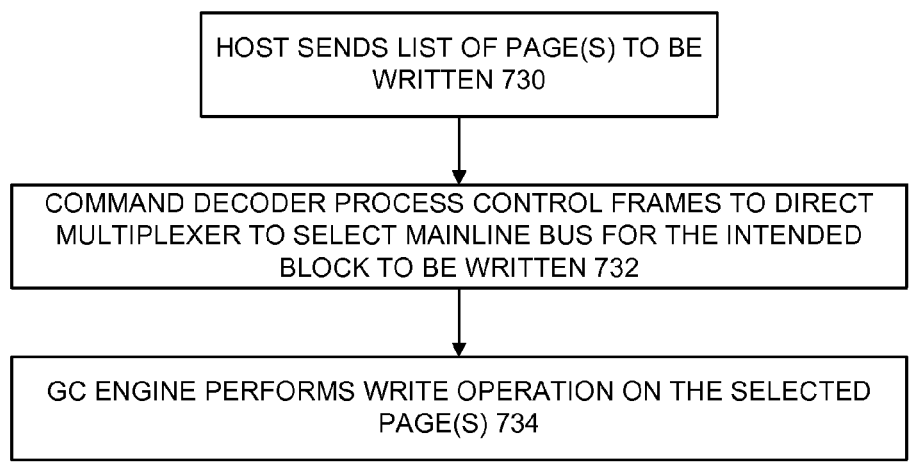

Referring to FIGS. 7A, 7B, and 7C, there are shown garbage collection operations in accordance with the preferred embodiments. In FIG. 7A there is shown an example, garbage collection embodiment generally designated by the reference character 700 of the flash memory system 200. In FIG. 7A, example erase and write operations are respectively indicated by encircled labels A, B, C, D, E, F and encircled labels A, B, C, G, H in accordance with preferred embodiments. FIGS. 7B and 7C respectively illustrate the erase operation and the write operation of FIG. 7A in the example flash memory system 200 in accordance with preferred embodiments.

As indicated at A in FIG. 7A and as indicated in a block 720 in FIG. 7B, erase operation begins with the host sending a list of blocks to be erased, for example, through control frames. As indicated at B, C, D in FIG. 7A and as indicated in a block 722 in FIG. 7B, the command decoder 218 in the garbage collection and scrub function engine 210 processes the control frames to direct the multiplexer control 216, and multiplexer 212 to select the internal bus 208 for the intended block 214 to be erased. As indicated at E in FIG. 7A and as indicated in a block 724 in FIG. 7B, the garbage collection and scrub function engine 210 performs the erase operation on the selected block. The bus is connected back to the mainline bus after the erase operation is completed, as indicated in a block 726 and at G in FIG. 7A.

Referring to FIG. 7C, the write operation begins as indicated at A in FIG. 7A, and as indicated in a block 730 with the host sending a list of one or more pages to be written. As indicated at B, C, G in FIG. 7A and as indicated in a block 732 in FIG. 7C, the command decoder 218 in the garbage collection and scrub function engine 210 processes the control frames to direct the multiplexer control 216, and multiplexer 212 to select the mainline bus 206 for the intended block 214 to be written. As indicated at H in FIG. 7A, and as indicated in a block 734, the garbage collection and scrub function engine 210 performs the write operation on the selected pages.

Figure 8:
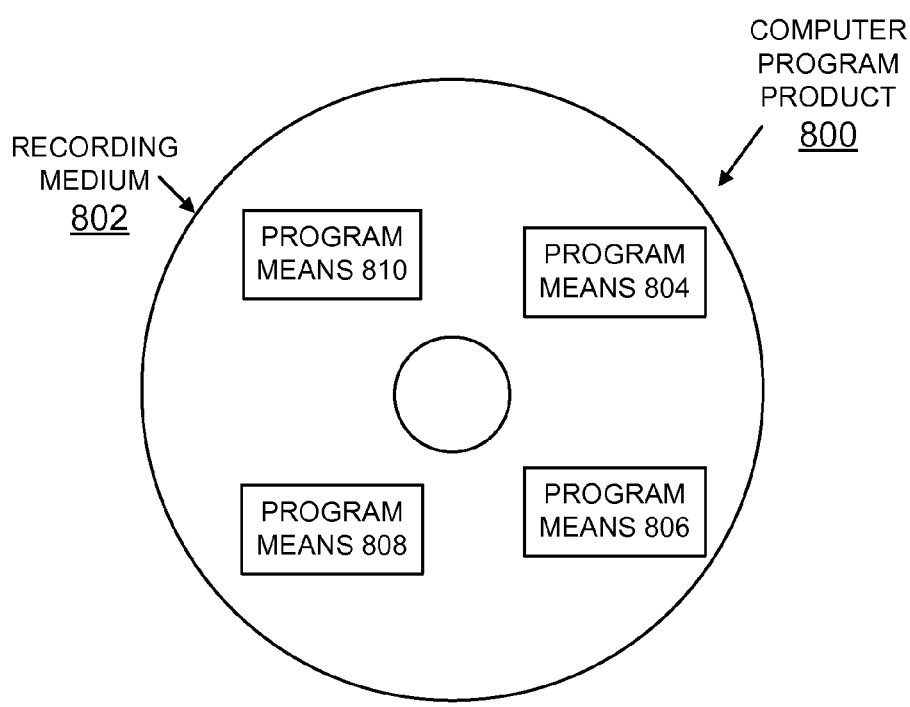
FIG. 8 is a block diagram illustrating a computer program product in accordance with the preferred embodiment.

Referring now to FIG. 8, an article of manufacture or a computer program product 800 of the invention is illustrated. The computer program product 800 is tangibly embodied on a non-transitory computer readable storage medium that includes a recording medium 802, such as, a floppy disk, a high capacity read only memory in the form of an optically read compact disk or CD-ROM, a tape, or another similar computer program product. Recording medium 802 stores program means 804, 806, 808, and 810 on the medium 802 for carrying out the methods for implementing enhanced performance in the flash memory system 200 of FIG. 2.

A sequence of program instructions or a logical assembly of one or more interrelated modules defined by the recorded program means 804, 806, 808, and 810, direct the flash memory system 200 for implementing enhanced performance of the preferred embodiment.

While the present invention has been described with reference to the details of the embodiments of the invention shown in the drawing, these details are not intended to limit the scope of the invention as claimed in the appended claims.

What is claimed is:

1. A flash memory system for implementing enhanced performance comprising:
   a flash memory device;
   a memory controller coupled to said flash memory device, said flash memory device comprising
   an internal bus for data movement;
   a memory buffer buffering garbage collection and scrub requests from a flash controller or a host controller;
   a function engine performing garbage collection and scrub operations using said internal bus for data movement, preserving input/output (I/O) bandwidth, and the garbage collection and scrub operations being interleaved with mainline reads and writes.

2. The system as recited in claim 1 includes control code stored on a computer readable medium, and wherein said flash memory device uses said control code for implementing enhanced performance.

3. The system as recited in claim 1 includes a mainline bus coupled to said flash memory device for mainline write operations.

4. The system as recited in claim 1 includes a switching infrastructure multiplexer in said flash memory device for selecting between the internal bus and a mainline bus.

5. The system as recited in claim 4 wherein said function engine includes a multiplexer control and a command decoder for performing garbage collection and scrub operations using the internal bus for data movement.

6. The system as recited in claim 4 wherein said function engine includes a command decoder receiving a list of blocks for garbage collection and scrub requests from said memory buffer and directing said switching infrastructure multiplexer for selecting said internal bus.

7. The system as recited in claim 1 includes said host controller coupled to the flash memory device, said host controller communicating a list of blocks to said flash memory device to be scrubbed.

8. The system as recited in claim 1 includes said host controller coupled to the flash memory device, said host controller communicating a list of blocks to said flash memory device for garbage collection.

9. The system as recited in claim 1 includes said host controller providing an order of write operations and background process erase operations for garbage collection in parallel to current writes in a write queue to free blocks in the flash memory device to accommodate upcoming writes.

10. The memory system as recited in claim 6, includes control code stored on a computer readable medium, and wherein said memory controller uses said control code to implement enhanced reliability of memory subsystems.

11. The system as recited in claim 6 includes said memory controller performing data verification periodically executing a complete push of all data from a respective one of first buffer or second buffer to the other one of second buffer or first buffer.

12. The system as recited in claim 11 includes said memory controller performing data verification during a memory mirroring process between the first buffer and the second buffer.

* * * * *